(12) United States Patent
Smith

(10) Patent No.: US 7,615,147 B1
(45) Date of Patent: Nov. 10, 2009

(54) METHOD AND APPARATUS FOR WATER TREATMENT

(76) Inventor: Sidney Smith, 900 Mohawk Rd., Savannah, GA (US) 31419

( * ) Notice: Subject to any disclaimer, the term of this patent is extended or adjusted under 35 U.S.C. 154(b) by 12 days.

(21) Appl. No.: 12/214,047

(22) Filed: Jun. 16, 2008

(51) Int. Cl.
*C02F 7/00* (2006.01)
*C02F 1/00* (2006.01)

(52) U.S. Cl. ............................. 210/170.05; 210/170.06; 210/206; 210/219; 210/242.1; 210/242.2; 261/92; 261/120

(58) Field of Classification Search ............ 210/170.01, 210/170.05, 170.06, 170.09, 170.1, 170.11, 210/198.1, 206, 219, 242.1, 242.2; 261/92, 261/120
See application file for complete search history.

(56) References Cited

U.S. PATENT DOCUMENTS

| | | | | |
|---|---|---|---|---|
| 2,546,317 A * | 3/1951 | Prizer | ......................... | 210/101 |
| 3,759,495 A | 9/1973 | Boler et al. | | |
| 4,409,107 A * | 10/1983 | Busch | ..................... | 210/242.2 |
| 4,822,579 A * | 4/1989 | Wagner | ................. | 210/170.05 |
| 4,908,131 A | 3/1990 | Moore | | |
| 5,116,501 A | 5/1992 | House | | |
| 5,176,503 A | 1/1993 | Palmer | | |
| 5,185,085 A * | 2/1993 | Borgren | .................... | 210/242.2 |
| 5,227,067 A * | 7/1993 | Runyon | .................. | 210/170.06 |
| 5,330,639 A * | 7/1994 | Murphree | .............. | 210/170.05 |
| 5,702,614 A * | 12/1997 | Taylor | .................. | 210/170.05 |
| 6,499,727 B1 | 12/2002 | Sylvester | | |
| 6,582,668 B2 * | 6/2003 | Green | .................... | 210/167.11 |
| 6,634,626 B2 | 10/2003 | Petrescu | | |
| 6,994,329 B2 | 2/2006 | Kronawitter | | |

* cited by examiner

*Primary Examiner*—Christopher Upton
(74) *Attorney, Agent, or Firm*—Patent Focus, Inc.; Richard C. McComas

(57) ABSTRACT

A water treatment device that chemically treats tidal water. The water may, if desired, be salt water or fresh water. The water treatment device is substantially cylindrical with paddles extending outward from central hubs. The paddles are T-shaped and are perforated. The perforation aids in water treatment by aerating the water as the tide movement turns the paddles. The water treatment device has a central perforated tray that is slidably insertable into the central hubs. The central hubs are open in the center to permit the aerated water from the paddles to come in contact with the water treatment chemicals in the central tray. The perforations of the central tray allow the water treatment chemicals to come into contact with the surrounding area to treat the tidal water.

9 Claims, 4 Drawing Sheets

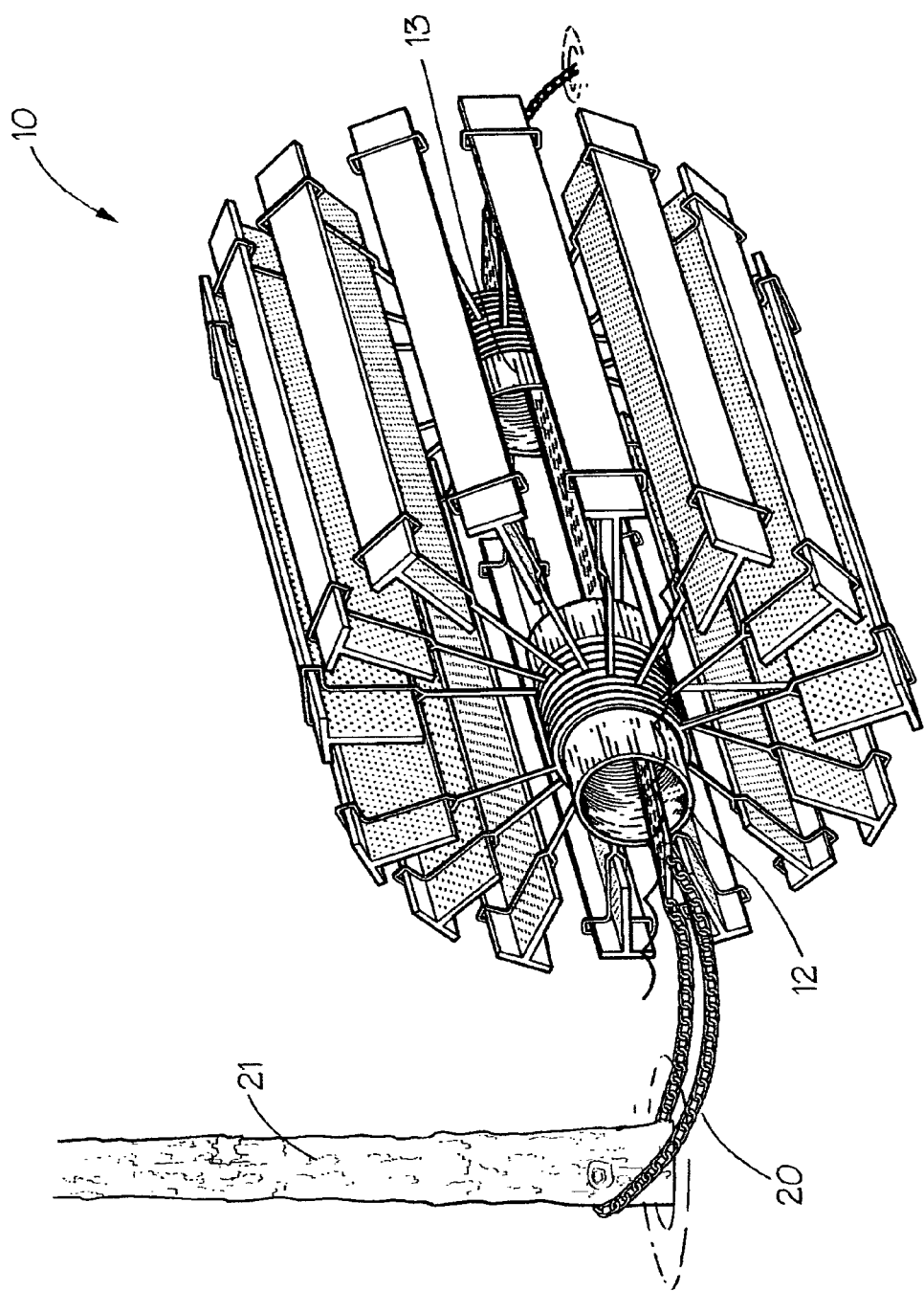

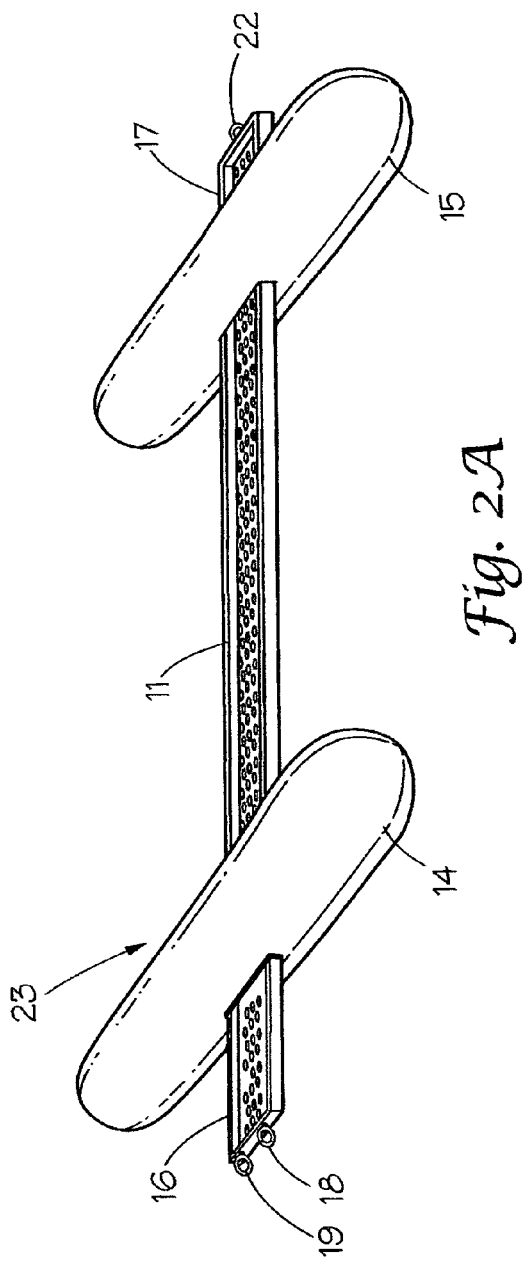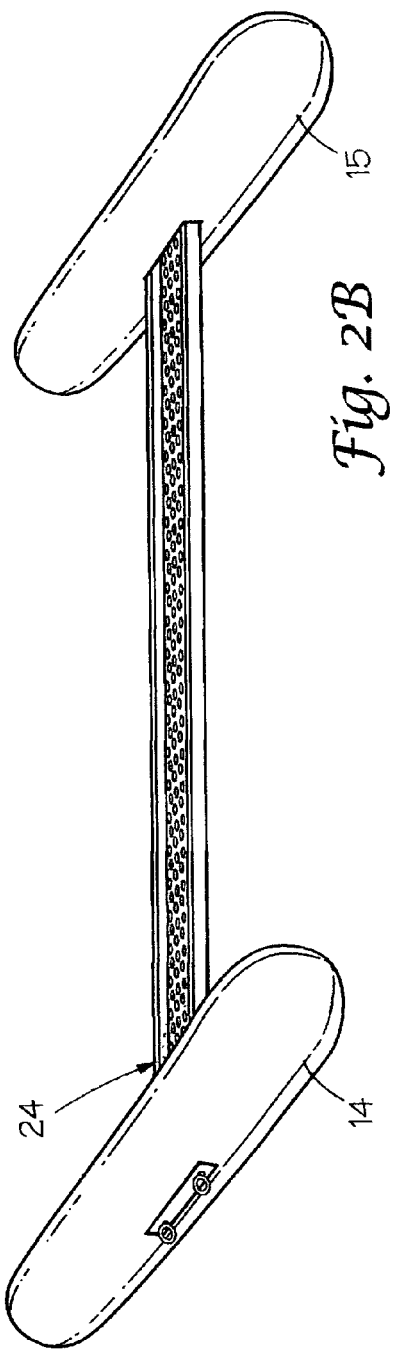

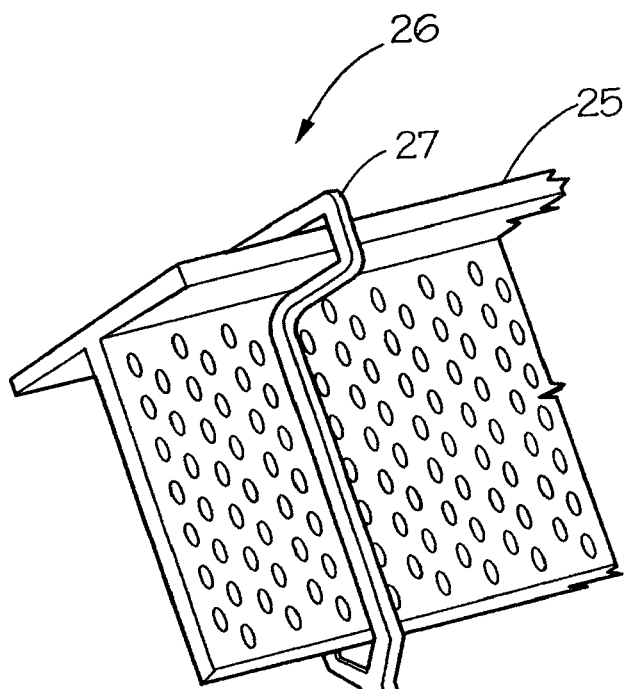
Fig. 3
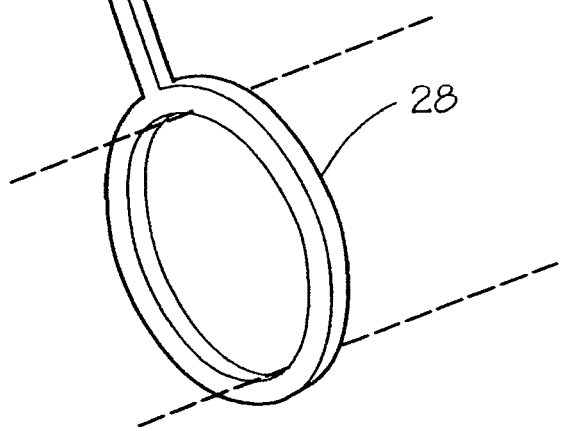

METHOD AND APPARATUS FOR WATER TREATMENT

BACKGROUND

Historically, aerating water has been done by a number of different types of apparatus. Examples of different types of apparatus are an air pump to pump air into the water resulting in air bubbles in the water and motor driven paddle wheels that lift the water into the air to oxygenate the water. It is generally known that higher levels of dissolved oxygen exist in water that is turbulent. Thus, turbulent water is able to support a higher concentration of aerobic life than standing water. Less active water will contain less dissolved oxygen and will thus support a lower concentration of aerobic life.

Engineering problems plague currently available aerators. The motor providing the power source for the aerators may be either on board or remote from the paddle wheel. Aerators using a remote motor must have a power delivery system to the paddle wheel. Aerators using on-board motors as power sources must have a way to secure and protect the motor. External on-board motors must have weatherproof casings to protect the motors from the elements. Aerators using on-board motors must utilize a floatation device buoyant enough to support the additional weight of the motor.

Due to the shallow depth of the water in which the aerators are being used, there is a limitation in the size of the floatation device and the motor. The efficiency of a device to aerate water is generally expressed as pounds of dissolved oxygen per horsepower per hour. Increasing the horsepower will increase the amount of dissolved oxygen. However, increasing the horsepower will also increase the size and weight of the motor and gearbox. Increasing the size and weight of the motor and gearbox will require a larger support system. Therefore, floating aerators with external on-board motors have a reduced efficiency due to the limitation on the size of the motor and gearbox that can be used and how they are attached to the paddle wheel.

It would be desirable to have a water aerating device that does not require a motor driving the paddle wheels. Further, the water aerating device would have means to chemically treat the surrounding area to reduce the bacteria count in the water therefore aiding the aquatic life.

SUMMARY

The present invention is a water treatment device to chemically treat tidal water. The water may, if desired, be salt water or fresh water. The water treatment device is substantially cylindrical with paddles extending outward from a central hub. The paddles are T-shaped and are perforated. The perforation aids in water treatment by aerating the water as the tide movement turns the paddles. The invention has a perforated tray centrally located to allow the tray to be slidably insertable into the central hub. The central hub is open in the center to permit the aerated water from the paddles to come in contact with the water treatment chemicals in the central tray. The perforations of the central tray allow the water treatment chemicals to come into contact with surrounding area to treat the tidal water.

BRIEF DESCRIPTION OF THE DRAWING

The invention is illustrated in the drawings in which like reference characters designate the same or similar parts throughout the figures of which:

FIG. 1B illustrates a top-level schematic diagram view of the present invention without floats connected to the elongated central tray, FIG. 2A illustrates a top-level schematic diagram view of the elongated central tray with the floats in position one, FIG. 2B illustrates a top-level schematic diagram view of the elongated central tray with the floats in position two, FIG. 3 illustrates a top-level schematic diagram top view of a T-shape paddle with perforations along the tongue portion of the T-shape paddles.

DETAILED DESCRIPTION

Figure 1A:
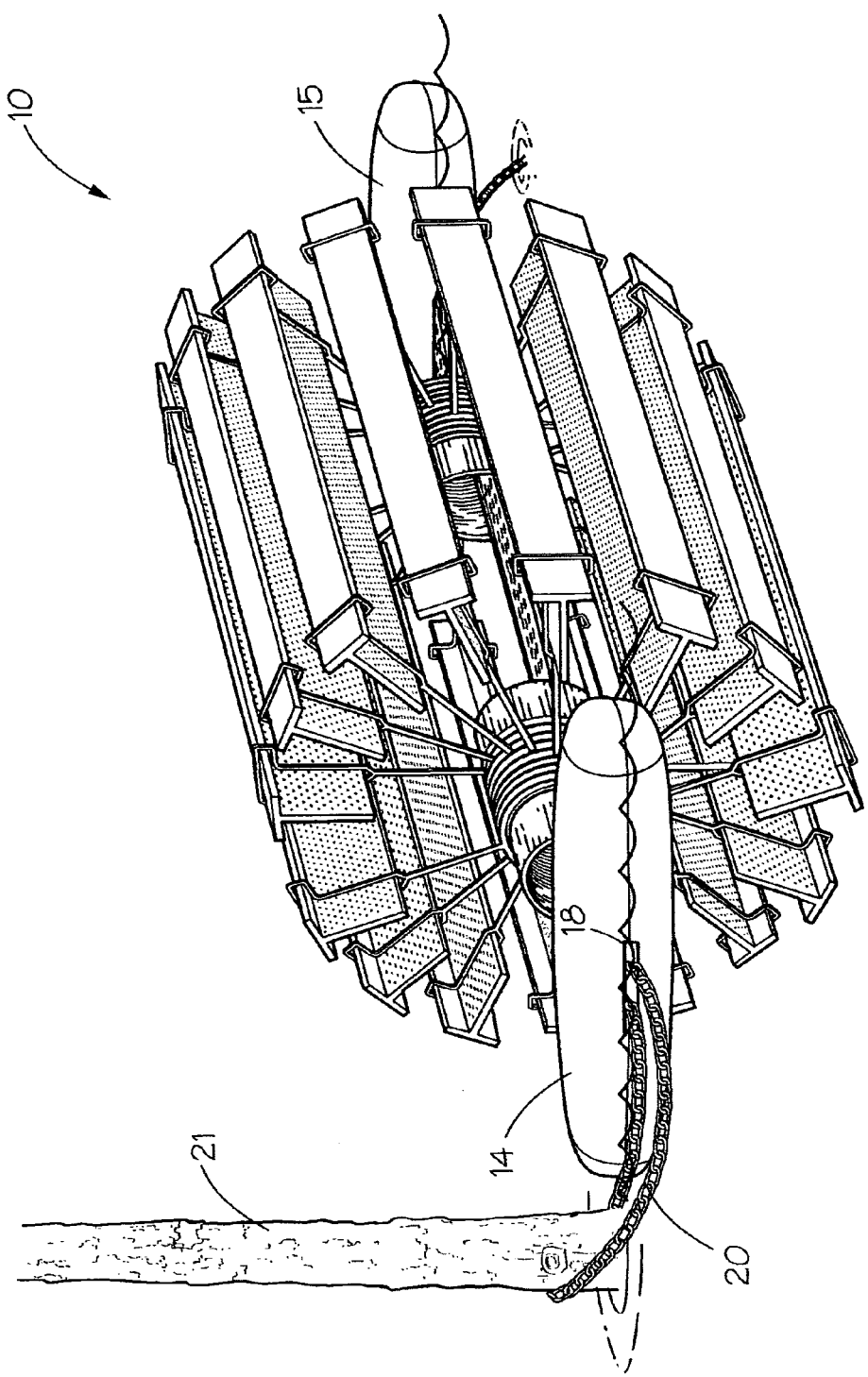
FIG. 1A illustrates a top-level schematic diagram view of the present invention with floats attached to an elongated central tray.

Before describing in detail the particular improved water treatment device to chemically treat tidal water in accordance with the present invention, it should be observed that the invention resides primarily in the novel structural combination of conventional chemical treatment components and in the particular detailed configuration thereof. Accordingly, the water treatment device arrangement has, for the most part, been illustrated in the drawing by readily understandable schematic diagrams. The drawings show only those specific details that are pertinent to the present invention in order not to obscure the disclosure with structural details which will be readily apparent to those skilled in the art having the benefit of the description herein.

The present invention 10, FIG. 1A is a water treatment device to chemically treat tidal water. The water may, if desired, be salt water or fresh water. Examples of tidal water are seawater and the Cooper River in South Carolina. Although the Cooper River is a fresh water river, its delta water level rises and falls with the tide of the Atlantic ocean.

The water treatment device has a perforated central tray 11, FIG. 2A suspended between two substantially round hollow hubs 12 and 13, FIG. 1B. The first hub 12 has one end of the central tray 11, FIG. 2A centrally located in the hollow hub. The second hub 13 is oppositely spaced from the first hub 12. The second hub 12 has the other end of the central tray 11 centrally located in the hollow hub 13. The central tray 11 is free floating and can slide a limited distance between the two hubs.

The distance is limited by two floats 14 and 15, FIG. 2A. The float 14 is slidably connected to the central tray's first end 16 and the float 15 is slidably connected to the tray's second end 17. The floats 14 and 15 have a first position 24 adjacent their respective ends 16 and 17. The floats 14 and 15 may, if desired, have a selected second position 23 disposed along the central tray's 11 longitudinal length. The second position is determined by the length of the water treatment device's paddles i.e., the longer the paddle the further the floats 14 and 15 are moved towards the center of the central tray. The converse is also true. The shorter the paddles the more the floats 14 and 15 are moved towards the ends of the central tray 11.

The central tray's first end 16 has two eyelets 18 and 19 connected thereto. The eyelets 18 and 19 have a connection device connected thereto and extend to an anchorage structure. An example, of the eyelets connected to an anchorage structure is a chain 20, FIG. 1A connected on one end a piling or tree 21 and the other end connected to the eyelets. The central tray's second end 17 has one eyelet 22 connected thereto. A second anchorage structure has one end connected to the central tray's second end 17 via a connection device and the eyelet 22. The other end of the anchorage structure is imbedded in the tidal waterbed.

The present invention 10, FIG. 1B has a plurality of paddles that provide the motion via the tidal current, to lift the paddles from the water and aerate the water. The paddle 25, FIG. 3 illustrates only one of the many paddles of the present invention 10. The paddle 25 is substantially T-shaped with perforations along the tongue portion of the paddle. The perforations allow water to pass through and aerate the water. The T-shaped paddle 25 is held in place by a member 26 that is T-shaped 27 on one end and is circular 28 on the other end. The T-shaped end 27 of member 26 has a hollow center that is sized to receive the T-shaped paddle 25. The circular end 28 of the member 26 is sized to receive either hub 12 or 13.

In operation: The present invention 10 is placed in tidal water and secured at each end of its central tray 11 by two anchorage structures. The paddles move through the tidal water four times a day and aerate the water as discussed above. The central tray 11 deposits its water treatment chemical into the surrounding water via the perforated bottom portion of the tray.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claim, means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

I claim:

1. Apparatus for a water treatment device comprising:
   a) a plurality of elongated T-shaped paddles each having a first end and a second end oppositely spaced from said first end;
   b) a first hub having said first end of each said T-shaped paddle connectively disposed thereto;
   c) a second hub having a second end oppositely spaced from said first end of said first hub;
   d) said second hub's second end connectively disposed to said second end of each said T-shaped paddle;
   e) an elongated tray having a first end and a second end oppositely spaced from said first end;
   f) said tray slidably insertable into said first and second hubs and
   g) a pair of floats connectively disposed to said tray.

2. Apparatus for a water treatment device as recited in claim 1 further comprising:
   a) said tray is perforated;
   b) a pair of eyelets connectively disposed to said tray's first end and the second end has a single eyelet disposed thereto.

3. Apparatus for a water treatment device as recited in claim 1 wherein said tray's first and second ends extend outward from said first and second hubs.

4. Apparatus for a water treatment device as recited in claim 1 wherein said T-shaped paddles are perforated.

5. Apparatus for a water treatment device as recited in claim 1 said first and second hubs are connectively disposed to said T-shaped paddles, said connection is by a T-shaped rod that has an open part disposed at one end, said open part is sized to receive one end of said paddle and the other end of the T-shaped rod is connectively disposed to its respective hub.

6. Apparatus for a water treatment device as recited in claim 1 wherein said tray is connectively disposed to a pair of anchorage devices.

7. Apparatus for a water treatment device as recited in claim 5 wherein said T-shaped rod's other end is shaped like a circular hoop and is sized to receive either said first or said second hub end.

8. Apparatus for a water treatment device as recited in claim 1 wherein said floats slide over the ends of said tray.

9. Apparatus for a water treatment device as recited in claim 1 further comprising:
   a) said pair of floats having a first position adjacently disposed to their respective ends of said tray; and
   b) said pair of floats having a selected second position disposed along said tray.

* * * * *